United States Patent [19]

Foucault et al.

[11] Patent Number: 4,805,945

[45] Date of Patent: Feb. 21, 1989

[54] TUBE JOINT COMPRISING MEANS FOR ANCHORING A SLEEVE AT ITS END

[75] Inventors: Joël Foucault, Blois; Alain Bonnargent, Montesson, both of France

[73] Assignee: Ermeto-Hydexco, Blois, France

[21] Appl. No.: 6,306

[22] Filed: Jan. 15, 1987

Related U.S. Application Data

[60] Continuation of Ser. No. 756,280, Jul. 18, 1985, abandoned, which is a division of Ser. No. 597,255, Apr. 6, 1984, Pat. No. 4,688,318.

[30] Foreign Application Priority Data

Apr. 11, 1983 [FR] France ................... 83 05872

[51] Int. Cl.$^4$ ............................ F16L 19/04
[52] U.S. Cl. .................. 285/341; 285/382.5; 285/382.7
[58] Field of Search ............ 285/382.7, 382.4, 382.5, 285/382, 258, 256, 341, 342

[56] References Cited

U.S. PATENT DOCUMENTS

| | | | |
|---|---|---|---|
| 2,477,676 | 8/1949 | Woodling | 285/382.5 X |
| 2,685,461 | 8/1954 | Mueller | 285/382.5 X |
| 2,857,666 | 10/1958 | Beyer . | |
| 3,188,733 | 6/1965 | Rickard | 285/382.4 |
| 3,467,414 | 9/1969 | Downing . | |
| 3,484,123 | 12/1969 | Van Der Velden | 285/382.7 X |
| 3,711,132 | 1/1973 | Nickerson | 285/382.4 |
| 3,730,567 | 5/1973 | Webster . | |
| 3,778,090 | 12/1973 | Tobin | 29/523 X |
| 4,043,160 | 8/1977 | Baker et al. | 29/523 |
| 4,130,932 | 12/1978 | Epmeier . | |
| 4,147,385 | 4/1979 | Van Der Velden | 285/382.4 |
| 4,390,303 | 6/1983 | Mallet | 29/523 X |

FOREIGN PATENT DOCUMENTS

| | | |
|---|---|---|
| 683803 | 12/1966 | Belgium . |
| 192072 | 11/1907 | Fed. Rep. of Germany . |
| 540825 | 1/1932 | Fed. Rep. of Germany . |
| 1022061 | 1/1958 | Fed. Rep. of Germany ... 285/382.4 |
| 1064906 | 5/1954 | France . |
| 2437560 | 4/1960 | France . |
| A081781 | 9/1963 | France ............... 285/382.4 |
| 1536521 | 8/1968 | France . |
| 2171718 | 9/1971 | France . |
| 2303981 | 10/1976 | France ............... 285/382.4 |
| 2412778 | 7/1979 | France ............... 285/256 |
| 680620 | 1/1965 | Italy ............... 285/382.4 |
| 2024973 | 1/1980 | United Kingdom . |

Primary Examiner—Thomas F. Callaghan
Attorney, Agent, or Firm—Sandler & Greenblum

[57] ABSTRACT

A method and apparatus are provided for joining tubes. The tubes have ends which are deformed within sleeves each sleeve having an interior channel formed by applying pressure to one end of the tube, a mandrel being temporarily positioned within the tube. Sockets are fitted on the exterior of the tube; pressure is applied to the end portions of the tubes to force the wall of the tube to deform in the area of the interior channels in the sleeve to thereby anchor the tubes within the sleeve. Once the mandrel and the sockets are removed from the interior and exterior of the tube and sleeve, respectively, the sleeve will be clamped within a joint member via a nut which is screwed onto the exterior surface of the sleeve.

11 Claims, 4 Drawing Sheets

TUBE JOINT COMPRISING MEANS FOR ANCHORING A SLEEVE AT ITS END

This application is a continuation of application Ser. No. 756,280, filed July 18, 1985 and now abandoned, which is a division of application Ser. No. 597,255, filed Apr. 6, 1984 and now U.S. Pat. No. 4,688,318.

BACKGROUND OF THE INVENTION

1. Field of the Invention

The invention relates to tube joints. It concerns in particular joints for tubes having a small diameter and/or a thin wall, such as are used for distributing fuel in aircraft or automobile engines.

2. Discussion of Prior Art

Generally, for the purpose of forming such a joint, the outer end of the tube to be joined is first provided with a cylindrical sleeve which can be anchored on said end, after which the sleeve is pressed into a joint member with a nut which is screwed on to the latter. It is essential that the anchoring of the sleeve on the tube should not cause the formation of lines or zones of reduced strength, particularly if the tube is of small wall-thickness. The process that seems to have met these technical anchoring requirements the most satisfactorily comprises the expansion of the end of the tube within the sleeve. The expansion process is very old and consists in introducing, into the tube, a mandrel of variable diameter so as to cause radial internal pressure which urges the tube against the inner wall of the sleeve which is provided with ribs and channels. In this method, an axially compressible mandrel is introduced into the tube, and then, with the help of a suitable system, the circumference of the mandrel is caused to expand in the zone of the channels in the sleeve, and the wall of the tube is thus radially pressed towards the bottoms of said channels. Then, after this interior shaping of the tube has been completed, the compression force is relaxed and the mandrel is withdrawn. The tube remains anchored in its sleeve and can then be connected in the usual manner by means of a joint member and a nut which can be screwed on to it.

The sleeves or sockets most frequently used are relatively long and for the purpose of achieving adequate anchoring, they comprise two spaced channels defining a separating rib and an end rib. Since the extent to which the tube cna be deformed is limited, the presence of a plurality of ribs in the sleeve is necessary to ensure an adequate latching action.

Although this process has been generally satisfactory, it involves difficulties and has been found inadequate for reliably meeting technical requirements that are becoming progressively more stringent. In the first place, the compressible mandrel is fragile and breaks when used in tubes of small diameter, and the process is increasingly more difficult to use as the wall-thickness of the tube diminishes. In the zone of the ribs and channels of the sleeve, and consequently in the zone where the diameter is expanded, the tube is stretched radially and longitudinally, and the thickness of its wall therefore diminishes slightly, and this is noticeable in a tube having a very thin wall. The presence of the ribs causes folding of the material of the tube accompanied by the onset of lines of reduced strength which are aggravated when the sleeve is pressed into the joint member and into the clamping nut. Furthermore, due to the presence of two channels, the conventional excess thickness of a sleeve corresponds only to the central channel, and a thin zone corresponds to the other channel or channels.

To overcome these difficulties, the Inventor has developed an anchoring process of the type consisting in deforming a tube within a sleeve having an interior channel, which process is characterized in that the deformation of the tube is achieved by the application of pressure to the end portion of its wall, a solid rigid mandrel having a smooth wall being temporarily placed within the tube, and preventing any inward deformation, and the pressure applied longitudinally at the end ofsuch tube causing deformation by upsetting of the wall of the tube in the zone of the channel in the sleeve, in such manner that the sleeve and the tube are undetachably secured to each other.

To achieve deformation only in the zone of the channel or channels in the sleeve, the tube and optionally its sleeve, as well, are held in position on the outside by one or more sockets and/or shells, and on the inside by a mandrel of suitable diameter, so that the only zone of expansion is determined by the channel in the sleeve. In one embodiment of the method, the mandrel is introduced into the tube and at the same time pressure is applied to the end portion of the tube on completion of the stroke of the mandrel. For this purpose, the mandrel comprises a suitable shoulder for moving into abutment with the end portion of the tube and then applying pressure thereto. In another embodiment, the tube extends slightly beyond the sleeve, and the mandrel comprises two spaced shoulders so that when it is introduced into the tube, the first shoulder causes the tube to expand, and the second shoulder applies pressure to the end portion of the tube. In a still further embodiment of the invention, two mandrels are used in succession. The first mandrel comprises a single shoulder which is applied to the end section of the tube and serves only to apply the pressure necessary for effecting deformation in the zone of the channel or channels in the sleeve. During this operation, the portion of the tube that extends beyond the sleeve is held in position by a suitable socket. After the first mandrel has been retracted, a second mandrel having a single shoulder and a wider portion is introduced into the tube so as to expand the portion extending beyond the sleeve and to apply the deformed portion to the end of said sleeve.

The invention covers not only the process, but the joint too. The sleeve used comprises a cylindrical bore without any internal ribs or other projections, but having a wide channel located at an externally thickened portion, preferably provided approximately midway along its length. Advantageously, the sleeve comprises a second channel within the first channel. This second channel is of smaller width, but has a greater diameter than that of the first channel. The second channel may be formed at any place in the bottom of the first channel, for example, along one edge of the first channel or at the middle thereof in such a way that a circular area of said first channel is present at each side of the second channel, thus defining the necessary anchoring and sealing shoulders. Where, in accordance with the process, the wall of the tube is seated in a sleeve having one channel, said wall has two circular attachment zones corresponding to the two shoulders defined by the channel within the sleeve. Where the wall of the tube is seated in a sleeve having a plurality of concentric channels, the wall of the tube comprises three or four circular attachment zones corresponding to the two or three shoulders defined by the two circular channels within the sleeve; the number of shoulders being dependent upon whether the second channel is or is not located at an end of the first channel. The expanded portion of the tube extends beyond the sleeve and the zone of deformation interconnecting the expanded and non-expanded portions is applied to the end of said sleeve, and this constitutes an additional shoulder and therefore an additional circular attachment zone.

After the end of the tube has been deformed, the mandrel and the sockets are withdrawn and the tube, seated in its sleeve, can then be connected with the aid of a joint member and of the nut screwed on to it.

BRIEF DESCRIPTION OF THE DRAWINGS

To enable the invention to be better understood, three embodiments will now be described by reference to the attached drawings, in which.

DESCRIPTION OF THE PREFERRED EMBODIMENTS

Figure 1:
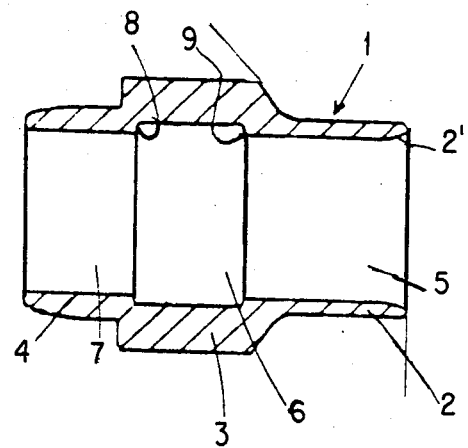
FIGS. 1, 2 and 3 are sectional view of through three sleeves in accordance with the invention.

FIG. 1 shows a section through a sleeve 1 which comprises, at one end, a tubular portion 2 with a flared mouth 2', at the center, a thickened portion 3 and, at the other end, a tubular portion 4 which is not flared but has an exterior slope which is preferably a part-spherical portion. The sleeve 1 comprises in its interior and from right to left a bore 5, a channel 6 and a further bore 7. The bores 5 and 7 are of the same diameter and are smooth-walled. The channel 6 has an appreciably greater diameter and a smooth cylindrical wall. The channel 6 also has shoulders 8 and 9 which face each other.

Figure 2:
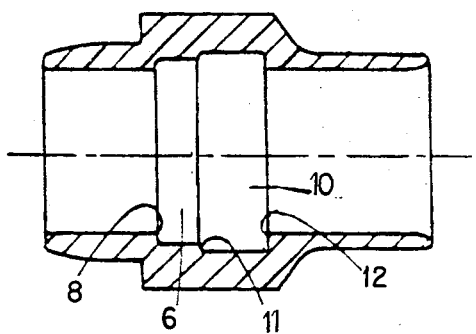

FIG. 2 illustrates a sleeve identical to that of FIG. 1 but with a second channel 10 concentric with the first channel 6 and comprising a shoulder 11 facing in the same direction as the shoulder 8 and a shoulder 12 instead of the shoulder 9 of FIG. 1 and more pronounced than the latter shoulder.

Figure 3:
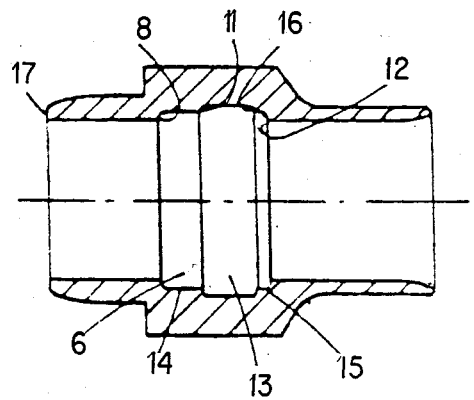
Figure 4:
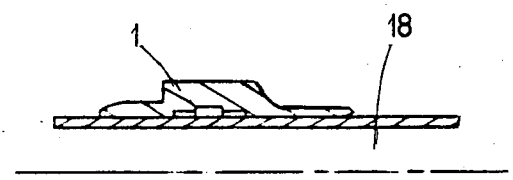
FIGS. 4 to 9 illustrate diagrammatically the successive phases of the process of flaring the tube in its sleeve.
Figure 5:
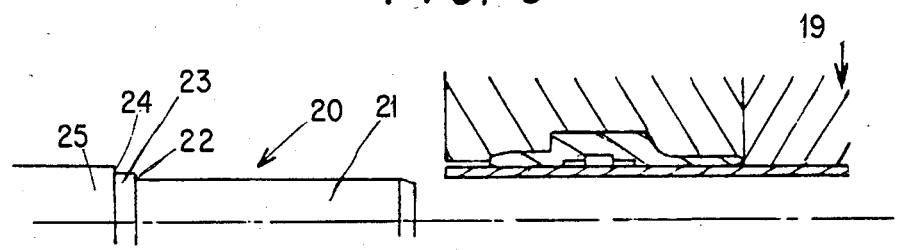
Figure 6:
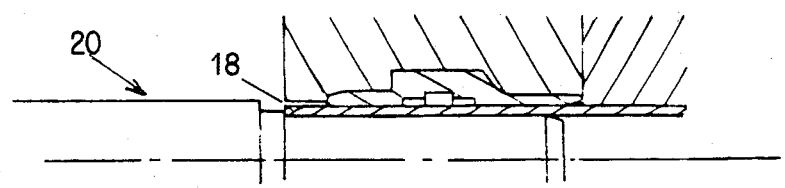
Figure 7:
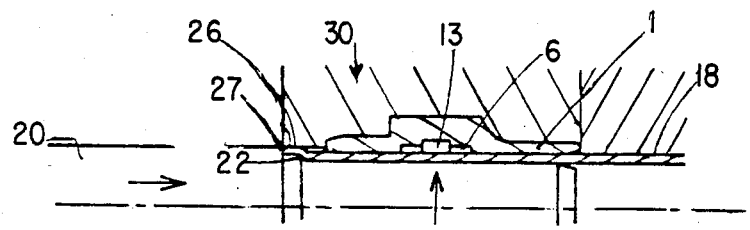
Figure 8:
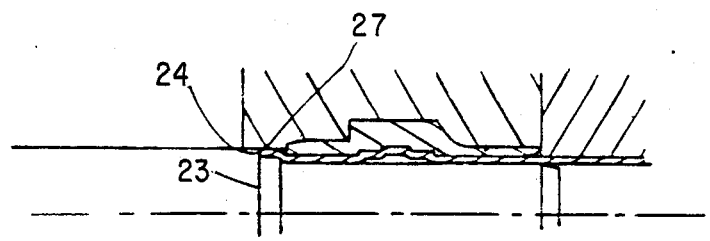
Figure 9:
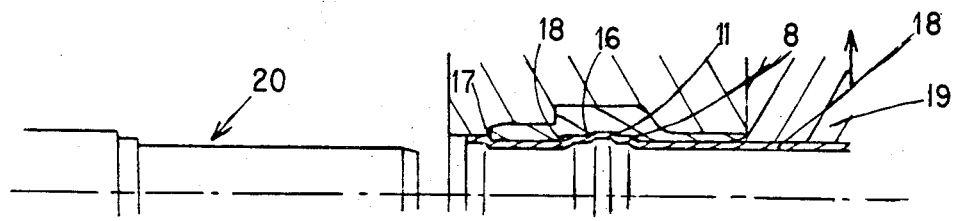
Figure 10:
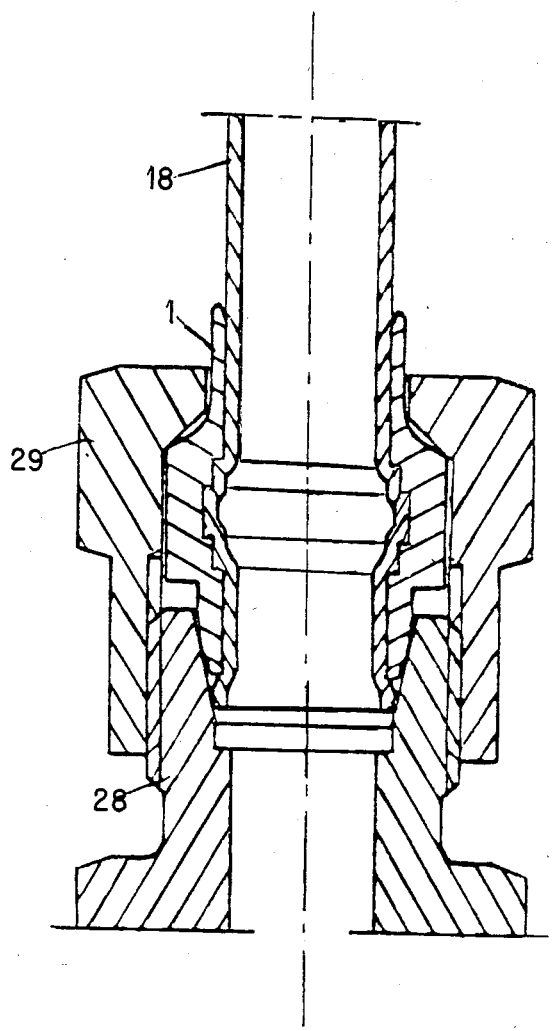
FIG. 10 shows, in section, the final joint.

FIG. 3 illustrates a sleeve identical to that shown in FIG. 1 but with a channel 13 concentric with the channel 6 and located midway along the sleeve so as to define areas 14 and 15, the sleeve also comprising shoulders 11 and 16. Thus, this sleeve has shoulders 8 and 11 facing in one direction, and shoulders 16, and 12 facing in the other direction. In addition to these four midway shoulders, the sleeve has an end 17 which also performs the function of a shoulder when the tube is expanded.

The method of seating is illustrated in FIGS. 4 to 9. The sleeve 1 is threaded over the tube 18 in such manner that the tube extends beyond the sleeve. A socket 19 is fitted on the tube to hold it in position, and shells 30 may be provided to support the sleeve 1. The sockets and shells prevent deformation of the tube at areas where this is not required. The mandrel 20 is solid and comprises three cylindrical portions 21, 23 and 25 of progressively increasing diameter which define shoulders 22 and 24. When the mandrel 20 is introduced into the tube 18, the portion 21 normally penetrates as far as the slightly inclined shoulder 22 so that the portion 23 in turn penetrates the interior of the tube 18 and expands it at 26 until its periphery 27 abuts the shoulder 24. As pressure continues and by the action of known means, the shoulder 24 applies very considerable pressure to the end portion 27 of the tube 18, the wall of which is pushed into the interior of the sleeve 1. Under this pressure, the tube 18 which is blocked in the socket 19 tends to deform only in the zone of the sleeve 1, and material of the tube passes into the channels 16 and 13 in the sleeve. As pressure continues, the wall of the tube 18 bears against the various channel shoulders. At the same time, the material of the tube builds up, and the wall tends to thicken rather than thin out as in the upsetting operation, and it also tends to harden, thus imparting to the end of the tube, treated in this way, a greater strength. Furthermore, the deformed portion 26 of the expanded zone of the tube 18 is applied to the end face 17 of the sleeve 1. After the mandrel 20 has been retracted, the tube 18 is clamped in the sleeve and has five anchoring points in relation to the shoulders 8, 11, 16, 18, 18 and 17. Finally, the socket 19 is likewise removed.

The tube 18, provided with its sleeve 1, is placed in the joint member 28 on which the nut 29 is screwed. The expanded portion 26 of the tube 18 then extends beyond the sleeve 1 to an extent such that its end part comes into contact with the joint cone 28 so as to establish direct mechanical contact between the tube 18 and the joint member 28 and, possibly, an additional seal.

Although intended for use in particular with tubes of small diameter and/or wall-thickness which are difficult to upset, the present invention can also be applied to other tubes. Also, the mandrels can be designed for use with tubes of any cross-section.

We claim:

1. Apparatus for joining a flexible tube to a sleeve, said tube being adapted to have said sleeve tightly anchored on said tube, said sleeve being rigid and having a plurality of internal channels, each of said channels being substantially annular and generally transverse to an axis of said sleeve, said tube being positioned within said sleeve and having at least one tube portion which is deformed within each of said channels, said sleeve having a substantially smooth internal bore and a first of said plurality of channels being positioned approximately midway between two free ends of said sleeve, wherein said first channel has first and second oppositely disposed shoulders and a diameter larger than the diameter of any other of said plurality of channels, said plurality of channels including at least one additional channel terminating at a first side at one of said first channel shoulders, said at least one additional channel being shoulderless at said first channel first side, a second side of said additional channel having a shoulder, said apparatus further comprising a joint member and a nut surrounding the exterior surface of said sleeve, wherein said plurality of channels are concentric and contiguous, said first channel and at least one of said additional channels having different diameters, all of said channels being directly adjacent to each other.

2. Apparatus in accordance with claim 1 wherein said tube, when deformed, is securely attached to two substantially circular attachment zones on the inside of said sleeve, one of said zones being located between said two opposed shoulders of said first channel, and a second one of said zones being located between said second shoulder of said first channel and said at least one additional channel shoulder.

3. Apparatus in accordance with claim 2 wherein one wall of said tube, when tube is deformed, assumes a shape which conforms to the configuration of the interior surface of each of said channels, said sleeve including at least three of said circular attachment zones.

4. Apparatus in accordance with claim 1 wherein said tube has two ends, at least one of said tube ends extending beyond a free end of said sleeve, said at least one tube end being substantially circular and forming an additional shoulder positioned about said free end of said sleeve, the free end of said sleeve forming an additional circular attachment and sealing zone between said tube and said sleeve.

5. Apparatus in accordance with claim 1 wherein the wall of said tube is generally thin.

6. Apparatus in accordance with claim 5 wherein the portion of the tube wall within the channels is thicker than the remaining portion of the wall of said tube.

7. Apparatus in accordance with claim 1 wherein at least a portion of said tube wall positioned within said channel is hardened to increase the strength of said tube wall.

8. Apparatus in accordance with claim 1 wherein said plurality of concentric channels comprises three channels, a central large diameter channel and two outer channels located on either side of the central channel, each of the outer channels having a diameter smaller than the diameter of the central channel.

9. A rigid sleeve comprising a substantially cylindrical member, said member having first and second free ends and a wall of non-uniform thickness located between said free ends, said sleeve wall having a thickness which increases in a direction from a first end of said sleeve towards the middle of said sleeve, the second end of said sleeve having a substantially sloping exterior surface which is adapted to be attached to a connecting member, said sleeve having a substantially smooth internal bore and comprising a plurality of interior sleeve channels, the shape and dimensions of said interior channels being selected to enable said sleeve to receive a tube of similar shape and dimension which is adapted to be anchored within said sleeve, the diameter of said channels being at least equal to the diameter of channels in said tube when said tube is inserted into said sleeve, said channels comprising a first, relatively wide channel having first and second opposed shoulders and two relatively narrow channels which are contiguous to respective ones of said first and second shoulders of said first channel, said first channel being recessed from said two narrow channels, said first channel having a larger diameter than each of said narrow channels.

10. A sleeve in accordance with claim 9 wherein said plurality of channels include at least one internal channel located at the position of increased thickness of said sleeve.

11. A sleeve formed in accordance with either of claims 9 or 10, in combination with a flexible tube having a first end and a second end, said tube having a longitudinal dimension longer than the longitudinal dimension of said sleeve, said first end of said tube adapted to be tapered by swaging of said sleeve when said tube is inserted into said sleeve.

* * * * *